(12) United States Patent
Brebner

(10) Patent No.: US 8,780,914 B2
(45) Date of Patent: Jul. 15, 2014

(54) PARALLEL PROCESSING OF NETWORK PACKETS

(75) Inventor: Gordon J. Brebner, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 455 days.

(21) Appl. No.: 13/274,945

(22) Filed: Oct. 17, 2011

(65) Prior Publication Data

US 2013/0094507 A1   Apr. 18, 2013

(51) Int. Cl.
*H04L 12/28* (2006.01)

(52) U.S. Cl.
USPC .......................................................... 370/392

(58) Field of Classification Search
CPC ................................ H04L 69/22; H04L 19/00
USPC .......................................................... 370/392
See application file for complete search history.

(56) References Cited

U.S. PATENT DOCUMENTS

| | | | |
|---|---|---|---|
| 5,862,128 A | 1/1999 | Cooperman et al. | |
| 6,275,508 B1* | 8/2001 | Aggarwal et al. | 370/503 |
| 7,305,047 B1* | 12/2007 | Turner | 375/316 |
| 7,715,419 B2 | 5/2010 | Tatar et al. | |
| 7,822,066 B1* | 10/2010 | Blott et al. | 370/474 |
| 2005/0163120 A1* | 7/2005 | Tachibana | 370/389 |
| 2005/0210185 A1* | 9/2005 | Renick | 711/105 |

OTHER PUBLICATIONS

U.S. Appl. No. 12/858,421, filed Aug. 17, 2010, Attig et al.
U.S. Appl. No. 13/273,087, filed Oct. 13, 2011, Brebner.
U.S. Appl. No. 13/229,083, filed Sep. 9, 2011, Attig.
U.S. Appl. No. 12/858,416, filed Aug. 17, 2010, Attig et al.
U.S. Appl. No. 12/858,418, filed Aug. 17, 2010, Attig et al.

* cited by examiner

*Primary Examiner* — Brandon Renner
*Assistant Examiner* — Faisal Choudhury
(74) *Attorney, Agent, or Firm* — LeRoy D. Maunu; Lois D. Cartier

(57) ABSTRACT

A packet processing circuit includes a plurality of header extraction circuits, and a scheduling circuit coupled to the plurality of header extraction circuits. The scheduling circuit is configured to receive one or more requests to extract header data of a respective packet from a data bus having a plurality of data lanes. In response to each request, the scheduling circuit determines a first subset of the plurality of data lanes that contain the respective header specified by the request, and assigns a respective one of the plurality of header extraction circuits to extract respective header data from the first subset of the plurality of data lanes.

19 Claims, 9 Drawing Sheets

PARALLEL PROCESSING OF NETWORK PACKETS

FIELD OF THE INVENTION

One or more embodiments of the invention generally relate to communication protocols, and more particularly to packet processors for manipulating data packets.

BACKGROUND

With increasing telecommunications line rates, it is necessary to use increasingly wide hardware data buses in order to maintain throughput. For example, in FPGA implementations, a 512-bit data bus is typically used for 100 Gb/s packet processing, and a 2048-bit data bus for 400 Gb/s packet processing. One consequence is that it is increasingly likely that more than one packet can be contained in a set of bits traversing the data bus in parallel. As used herein, each set of bits transmitted over the full width of the data bus in parallel is referred to as a word.

As one example, given a minimum packet size of 64 bytes, some packets may not be entirely contained in a 512-bit word. A first data packet may begin in a previous word and end in the current word, and a second data packet may begin in the current word and end in a subsequent word. As another example, a single 2048-bit word may include the ending portion of one packet, three complete packets, and the beginning portion of another packet. To maintain a desired level of throughput, parallel hardware may be needed to deal with the multiple packets in a single cycle. However, parallel hardware is expensive in terms of required logic resources and power consumption.

Packet processing hardware is often organized as a pipeline. Simple solutions employ multiple identical instances of packet processing hardware. If a maximum of K packets may be presented at once, then the packet processing hardware for extracting header information and data is replicated K times.

Some previous solutions implement a plurality of pipelines, each configured to receive and extract data from any offset of a word received on the data bus. For example, in one parallelization approach, the entire data path is fanned-out into K independent hardware pipelines. Another approach employs a single pipeline, with K parallel units at each stage. Although all data is still potentially made available to all units, there is just a single data path and the parallel units can be selective in tapping into the data path. In either approach, each pipeline is configured to extract header and data fields of a packet from any offset of the received word. Such solutions provide flexibility to allow any one of the parallel circuits to be scheduled to process any one of a received set of packets. However, these solutions may be expensive in terms of hardware requirements.

Data and/or header fields of packets are separated from a received word through a process referred to as extraction. Extraction involves shifting the relevant field of data out of the received word. If a packet field can begin at any offset within a received word, a generic shifter capable of shifting through the entire received word is required. The above approaches require a large amount of circuitry for extraction of header and data fields of the packets because each pipeline must be capable of extracting relevant bits from any offset in the entire word. These approaches are also expensive in terms of routing resources and power consumption since much redundant data is being sent to the parallel pipelines.

One or more embodiments may address one or more of the above issues.

SUMMARY

In one embodiment a packet processing circuit is provided. The packet processing circuit includes a plurality of header extraction circuits, and a scheduling circuit coupled to the plurality of header extraction circuits. The scheduling circuit is configured to receive one or more requests to extract header data of a respective packet from a data bus having a plurality of data lanes. In response to each request, the scheduling circuit determines a first subset of the plurality of data lanes that contain the respective header specified by the request, and assigns a respective one of the plurality of header extraction circuits to extract respective header data from the first subset of the plurality of data lanes.

In another embodiment, a pipeline packet processing circuit is provided. The pipeline packet processing circuit includes a plurality of memory buffers arranged in a pipeline to buffer words received from a data bus, each memory buffer having a plurality of data lanes. A plurality of extraction stages are arranged in a pipeline and coupled to respective ones of the plurality of memory buffers. Each extraction stage is configured to extract headers of a different level of a data packet of a word buffered on the pipeline of memory buffers. Each extraction stage includes a plurality of packet header extraction circuits and a scheduling circuit. The scheduling circuit is configured to receive one or more requests to extract respective packet headers of a corresponding level from a word stored in a corresponding one of the pipeline of memory buffers. For each request, the scheduling circuit determines a first subset of data lanes, of the corresponding memory buffer, that contain the respective header specified by the request. The scheduling circuit assigns a respective one of the header extraction circuits to extract the header from the determined first subset of lanes of the corresponding memory buffer.

In yet another embodiment, a method of generating a network packet processing circuit is provided. A specification describing packet parameters is input. Packet parameters include a data bus width (N), a lane width (Q) of data lanes of the data bus, a minimum packet size of packets to be received via the data bus, and a maximum header size of the packets to be received via the data bus. A number of header extraction circuits (K) is determined based on the packet parameters. A respective first subset of data lanes is determined for each of the K header extraction circuits based on the packet parameters. A circuit specification is generated that describes a packet processor having K header extraction circuits, routing circuitry, and a scheduling circuit coupled to the K header extraction circuits. The routing circuitry is configured to route data from each respective subset of data lanes to the corresponding one of the K header extraction circuits. The scheduling circuit is configured to receive one or more requests to extract header data of a respective packet from a data bus having a plurality of data lanes. In response to each request the scheduling circuit determines a second subset of the plurality of data lanes that contains the respective header specified by the request, and assigns a respective one of the plurality of header extraction circuits to extract respective header data from the second subset of the plurality of data lanes. The second subset is included in the respective first subset of the assigned one of the plurality of header extraction circuits.

It will be appreciated that various other embodiments are set forth in the Detailed Description and Claims, which follow.

BRIEF DESCRIPTION OF THE DRAWINGS

Various aspects and advantages of the invention will become apparent upon review of the following detailed description and upon reference to the drawings, in which.

DETAILED DESCRIPTION

One or more embodiments provide a hardware-efficient parallel architecture for a packet processing circuit. The packet processing circuit includes a plurality of header extraction circuits for processing header information of a plurality of packets received on a data bus. The data bus is divided into a plurality of data lanes. Each header extraction circuit is configured to receive and extract header information from a respective subset of the data lanes. Because only a subset of data lanes are received by each extraction circuit, less routing circuitry is required and the extraction performed by each extraction circuit may be implemented using smaller shift circuits.

Figure 1:
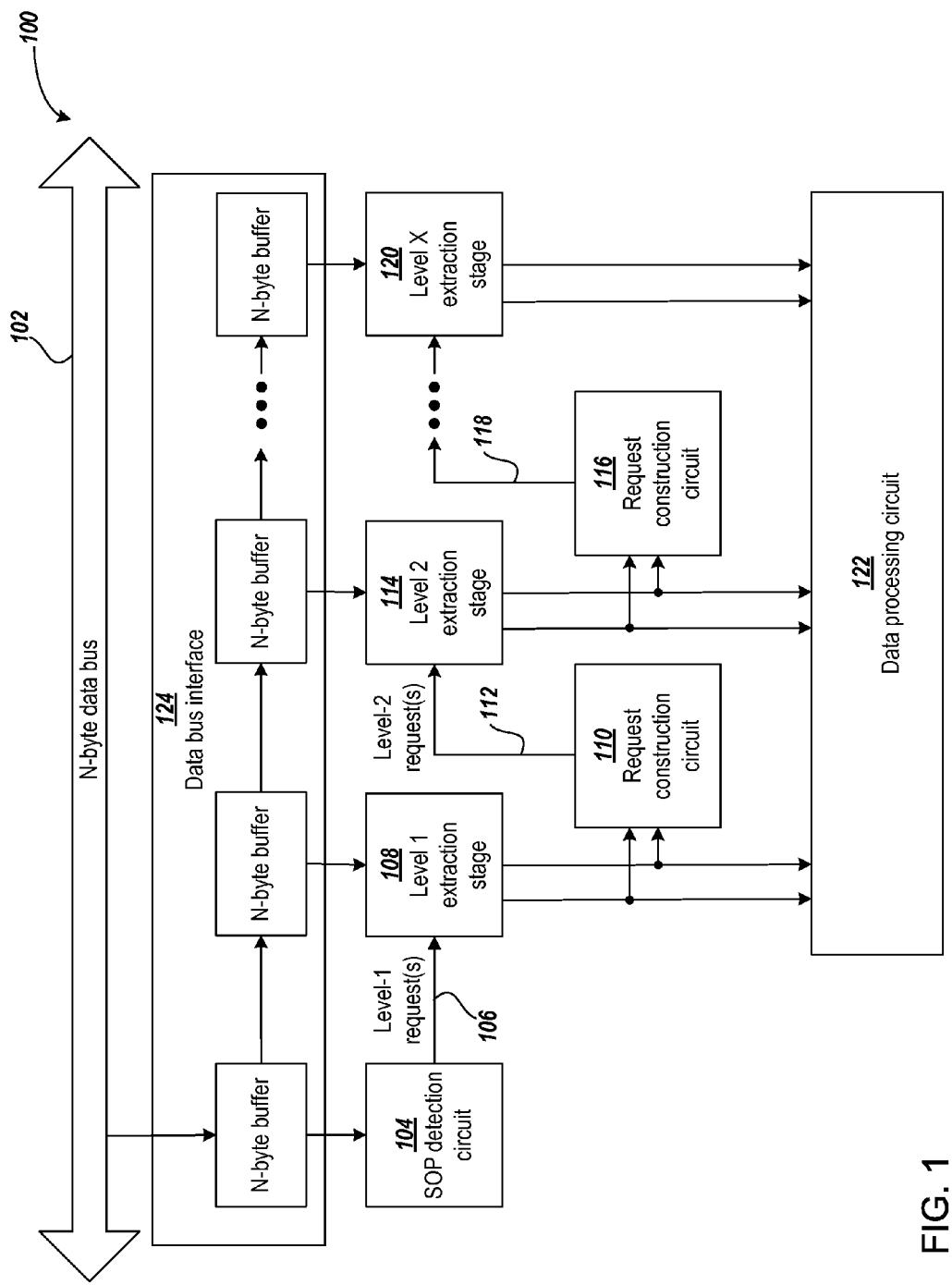
FIG. 1 shows an example packet processing pipeline in accordance with one or more embodiments.

FIG. 1 shows an example packet processing pipeline 100 configured in accordance with one or more embodiments. An interface circuit 124 receives and buffers words from N-byte data bus 102 in a pipeline of N-byte memory buffers. For each word received, the word is stored in a first memory buffer and previously received words are passed along the pipeline of memory buffers for access by various extraction stages 108, 114, and 120.

Each packet may include a stack of headers, up to a maximum header level depth M. In this example, the pipeline includes M extraction stages (108, 114, and 120) for extracting header information from multiple levels of a header stack, each stage handling one header in the header stack. The pipeline may have fewer than M stages, with each stage handling one or more consecutive headers.

For each word received via data bus 102, start of packet (SOP) detection circuit 104 generates a request to extract header information for each packet detected in the word. The packets are detected based on SOP data associated with the word. The extraction requests are sent to a first extraction stage 108, which is configured to extract header information corresponding to each of the extraction requests from the word buffered in interface circuit 124.

The extraction requests generated by SOP detection circuit 104 indicate where the desired header information to be extracted is located within the received data word. The header extraction requests may be implemented in a number of alternative formats, which may include various data values to indicate header information to be extracted for a packet. In this example, each extraction request includes an offset at which the requested header begins in the received word and a header format indicator, which can be used to determine the location of various fields within the header. The request may also include a packet identifier, which is chosen to be unique over at least two consecutive word cycles. The packet identifier can be used to identify header information corresponding to the packet in each of the plurality of extraction stages.

Each extraction stage includes a plurality of header extraction circuits (not shown), one for each of a maximum number of packets that may be included in a received word. For each extraction request received, the extraction stage is configured to assign a respective one of the plurality of header extraction circuits to extract the requested header information. The extracted header information data may include, for example, data of various header fields or pointer data that references various header fields of the requested header.

Extracted header information from each extraction stage is output for further processing, such as by data processing circuit 122. The data processing circuit 122 uses the extracted header field values and pointers for further packet processing. Depending on the header level depth of a packet, the packet may need to be processed by one or more additional extraction stages 114 and 120 in the pipeline. The additional extraction stages extract header information for nested levels of the header stack of the packet. In this example, the pipeline includes request construction circuits 110 and 116 between the extraction stages to determine whether the packet contains an additional header in another level of the header stack. If so, a request is generated and transmitted to the next extraction stage 114 or 120. Extraction stages 114 and 120 operate in a manner that is similar to operation of extraction stage 108 using data words stored in corresponding ones of the pipeline of memory buffers of the interface circuit 124.

While the examples and embodiments are primarily described with reference to extraction of a single header level of a packet in each extraction stage, it is recognized that multiple headers of a header stack may be extracted in one stage if it is not necessary for external logic to decide on actions between one header and the next.

Figure 2:
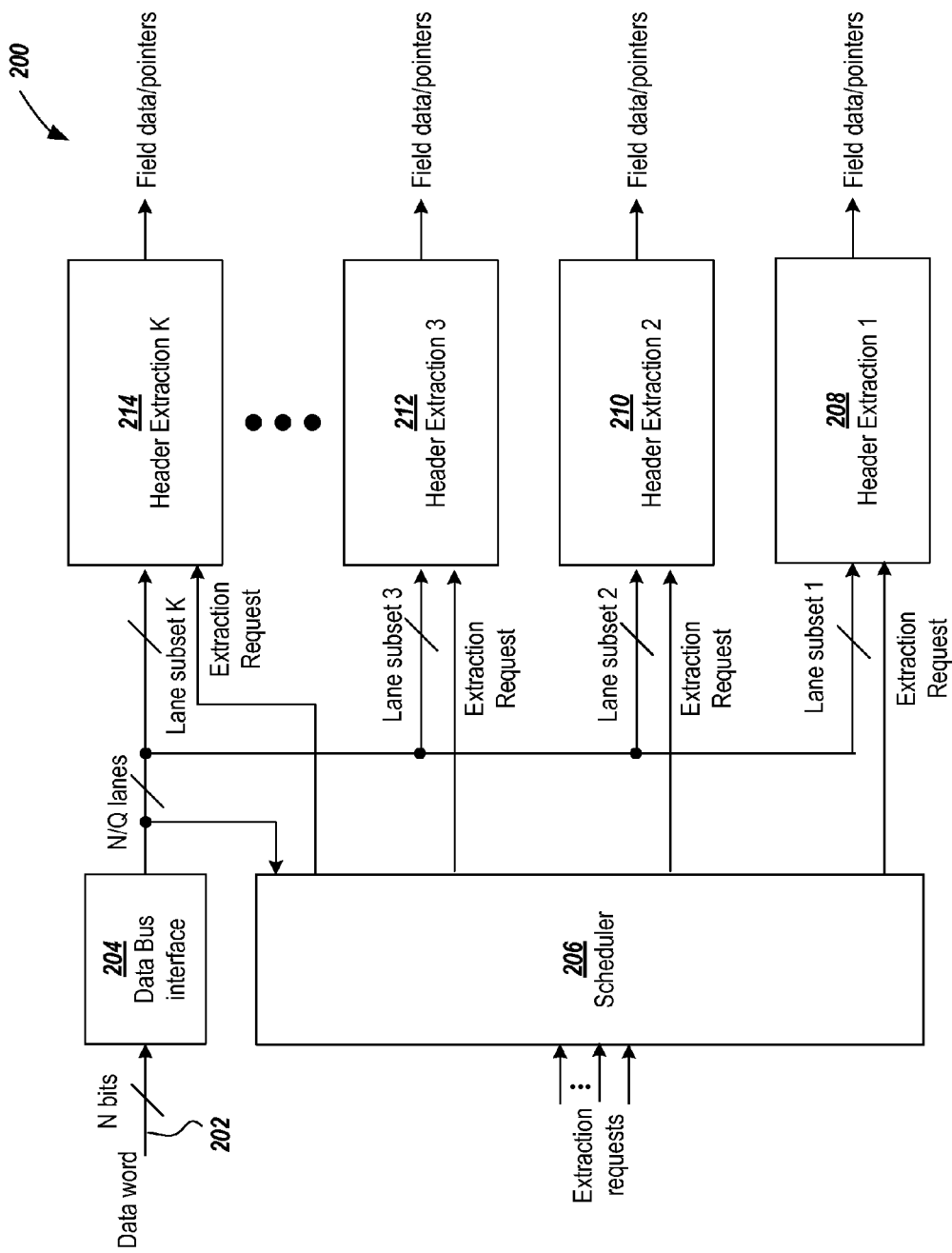
FIG. 2 shows an example packet processing circuit that may be used to implement an extraction stage of the packet processing pipeline shown in FIG. 1.

FIG. 2 shows an example packet processing circuit that may be used to implement an extraction stage of the packet processing pipeline shown in FIG. 1. The packet processing circuit 200, includes data bus interface circuit 204 for receiving data words from an N-byte data bus having a plurality of Q-byte data lanes. The circuit includes K header extraction circuits 208, 210, 212, and 214, each of which is configured to receive a respective subset of the data lanes and extract header information from one or more of the subset of data lanes. In other words, each extraction circuit is configured to extract header information from a respective range of data lanes of the N-byte bus. The number of header extraction circuits, K, is equal to the maximum number of minimum size packets and packet fragments that may be received in a single N-byte word. Because only a subset of data lanes is received by each extraction circuit, less routing circuitry is required and extraction may be implemented using smaller shift circuits.

For each word received on data bus 202, scheduler circuit 206 receives a set of extraction requests to extract header information from respective packets included in the received data word. For each extraction request, the scheduler circuit determines which data lanes of the word are occupied by the indicated header and assigns the extraction request to a header extraction circuit whose respective subset of lanes includes the determined data lanes corresponding to the extraction request. In this example, assignment of an extraction request to a header extraction circuit is performed by forwarding the request to the assigned header extraction circuit. However, it is recognized that some embodiments may adjust the format of an extraction request before forwarding or may otherwise direct the assigned header extraction circuit to extract the requested header information.

Figure 3:
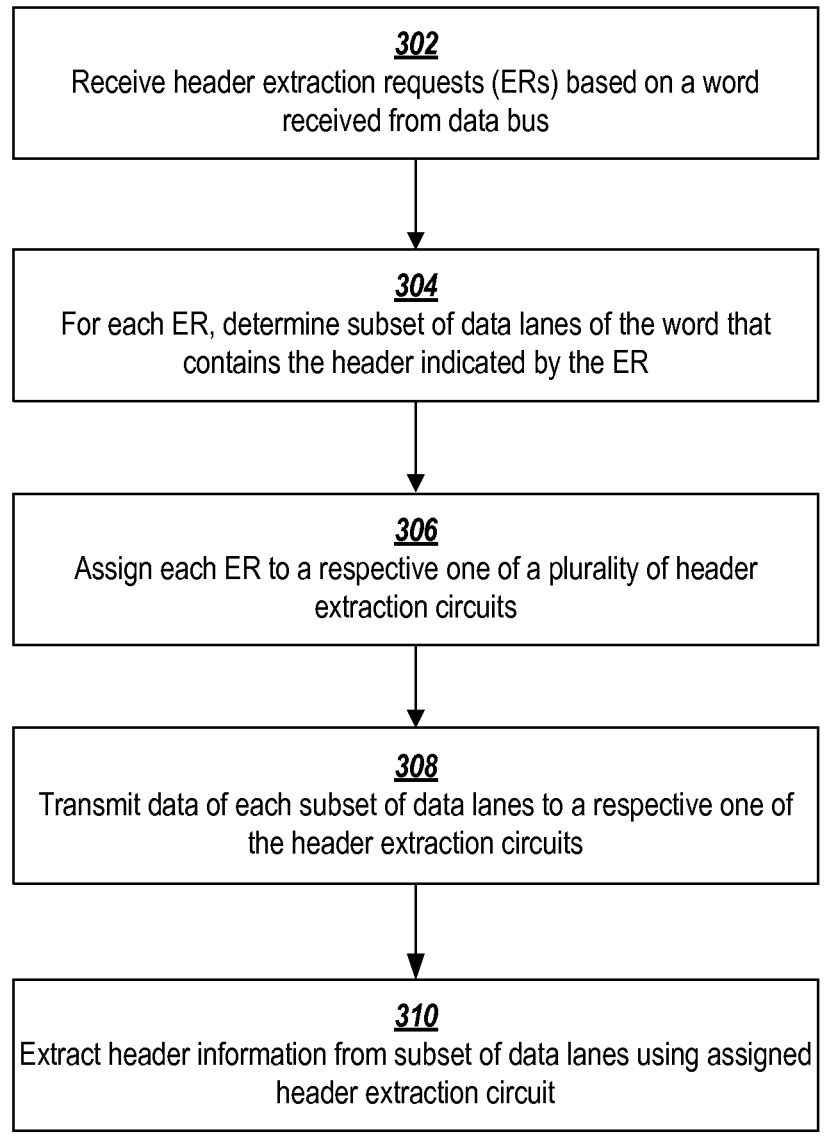
FIG. 3 shows a flow chart of an example process for extracting headers of data packets in accordance with one or more embodiments.

FIG. 3 shows a flow chart of an example process for extracting headers of data packets received on a data bus. The process may be implemented using the packet processing circuit shown in FIG. 2. Header extraction requests (ERs) are input based on a word received from the data bus at block 302. For each extraction request, a subset of data lanes of the word that contain the header indicated by the extraction request is determined at block 304. Each extraction request is assigned to a respective one of the plurality of header extraction circuits at block 306. Data of each subset of data lanes is transmitted to a respective one of the header extraction circuits at block 308. Header data is extracted from the subset of data lanes using the assigned header extraction circuit at block 310.

It should be understood that the respective subsets of data lanes routed to the header extraction circuits are not mutually exclusive because headers may span the boundaries of the data lanes. If the data lanes were evenly portioned into mutually exclusive subsets, multiple header extraction requests referencing the same subset could not be processed in parallel by different header extraction circuits. To ensure extraction requests can be processed in parallel, the respective subsets of data lanes routed to neighboring header extraction circuits overlap to provide some flexibility in the scheduling of received header extraction requests. This overlap allows scheduling to be performed such that each header extraction circuit is assigned at most one extraction request per word received on data bus 202.

Figure 4:
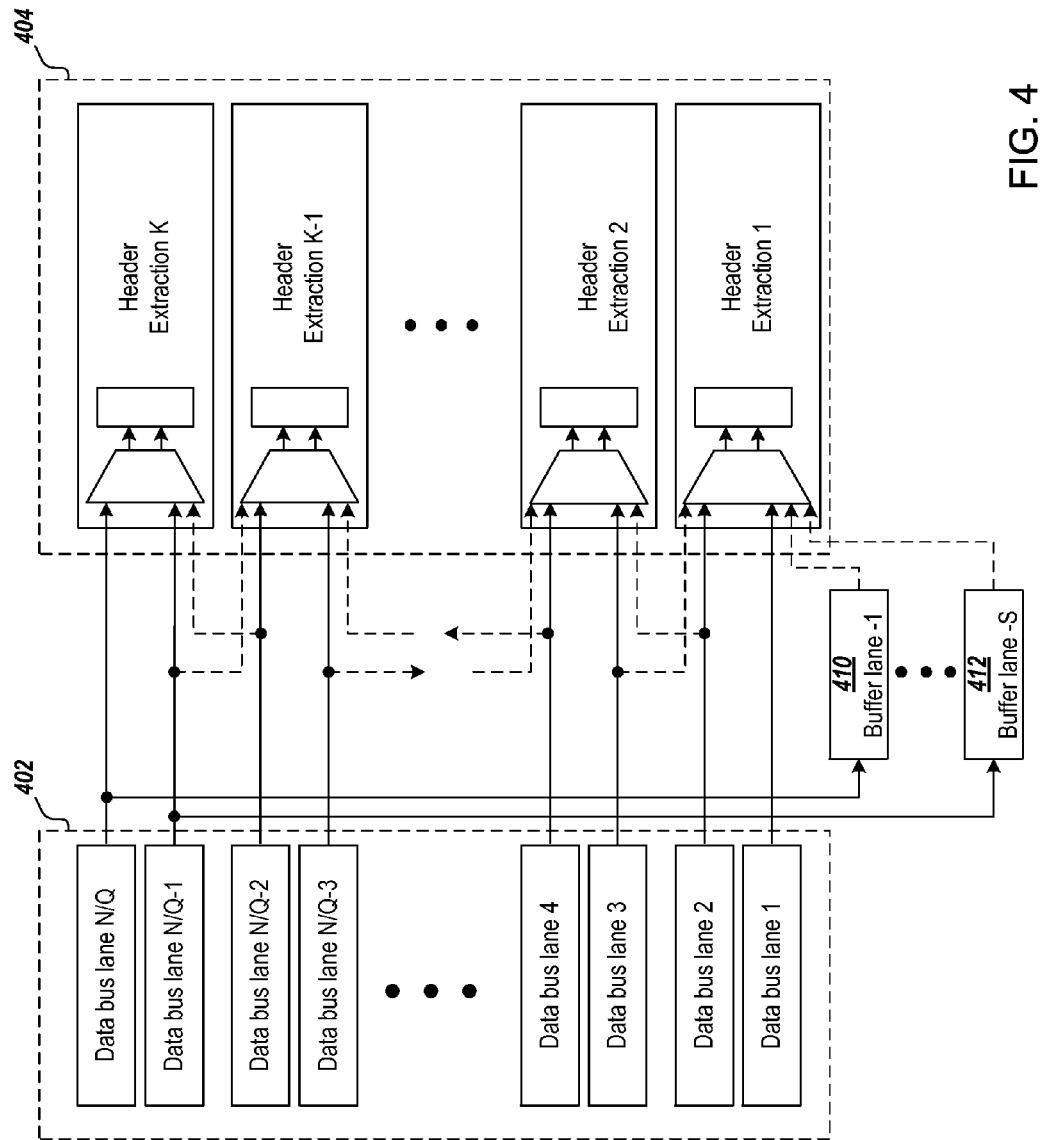
FIG. 4 illustrates an example routing of data lane subsets to respective header extraction circuits in accordance with one or more embodiments.

FIG. 4 illustrates an example routing of data lane subsets to respective header extraction circuits in accordance with one or more embodiments. The number of header extraction circuits and the routing of data lanes 402, which can ensure that header extraction circuits 404 can process all header extraction requests in parallel, depends on a number of architectural parameters including the number of lanes (L) occupied by a packet of minimum size, and the number of data lanes (S) occupied by a header of maximum size (H).

For ease of illustration, the examples and embodiments are primarily described herein with reference to N/Q data lanes that are routed from an N-byte data bus to a plurality of header extraction circuits 404, where the data lanes are Q bytes, S=2 lanes, and L=2 lanes.

In general, the N/Q data lanes may be partitioned into mutually exclusive groups, which are assigned and routed to header extraction circuits, as shown by the solid arrows. Header extraction circuit 1 is configured to receive data lanes 1 and 2, each of middle header extraction circuits 2 through K−1 is configured to receive L data lanes, and header extraction circuit K is configured to receive any remaining data lanes. In this example, where L=2, the N/Q data lanes are evenly divided into mutually exclusive groups having 2 data lanes each.

Overlap of subsets of data lanes is provided by routing additional data lanes, as shown by dashed arrows. For ease of explanation, data lanes routed to a header extraction circuit with solid arrows may be referred to as default data lanes of the header extraction circuit, and additional data lanes routed to the header extraction circuit with dashed arrows may be referred to as non-default data lanes of the header extraction circuit. The amount of overlap is determined by the parameters S and L. Where L=2, each header extraction circuit receives S−1 non-default data lanes that are default lanes routed to the above neighboring header extraction circuit (if available) and 1 non-default data lane that is a default lane routed to the below neighboring header extraction circuit (if available).

As a result of the above routing, the header extraction circuit 1 receives data from data lanes 1 through 2+(S−1). Each middle header extraction circuit i receives data from data lanes 2*i−2 through 2*i+(S−1). Header extraction circuit K receives data from data lanes 2*K, 2*K−1, and 2*K−2.

It is recognized that a header may span two or more consecutive words. In such cases data cannot be extracted from the header until more data is received in the next word(s). Buffer lanes 410 and 412 are provided to buffer the last S data lanes of the previous word(s). If an incomplete header is received, the previous lanes may be processed by header extraction circuit 1 when the final portion of the header is received in the subsequent word.

In the example where L=2, extraction requests may be scheduled for processing by the header extraction circuits according to the above assignment of default data lanes and the location of the end of the corresponding packet. If the highest default lane assigned to a header extraction circuit (as indicated by the solid arrows) does not contain an end of packet, any request received on the data lane is scheduled for processing by the above neighboring header extraction circuit. Otherwise, the request is scheduled for processing by the header extraction circuit that is assigned the data lane containing the request as a default data lane.

Numerically speaking, for a request received on data lane J, where J<K, the request is assigned to header extraction circuit J/2+1 for processing if J is an even number and the data lane that does not include an end of packet. Otherwise, the request is assigned to header extraction circuit (J+1)/2.

For architectures that implement L>2, in addition to the above default data lanes, header extraction circuit 1 receives one additional non-default data lane, which is also received by header extraction circuit 2, and each middle header extraction circuit receives S+1 additional non-default data lanes from the above neighboring header extraction circuit (if available). Each of header extraction circuits 2 through K also receives an additional non-default data lane from the below neighboring header extraction circuit.

As a result of the default and non-default routing of data lanes, header extraction 1 circuit receives data from data lanes 1 through S+3. Each middle header extraction circuit i receives data from data lanes L*(i−2)+2 through L*(i−1)+(S+3). Header extraction circuit K receives data from data lanes L*(K−2)+2 through N/Q.

For L>2 implementations, extraction requests may be scheduled for processing by the header extraction circuits 404 based on the data lane of the request and the beginning/end of the corresponding packet. For example, if the highest default data lane of a bottom or middle header extraction circuit contains the start of a packet, any request received on that lane is assigned to the above neighboring header extraction circuit for processing. If the lowest default data lane of a middle or top header extraction circuit contains the end of a packet, any request received on that lane is assigned to the below neighboring header extraction circuit.

Numerically speaking, for a request received on data lane (J), the request is assigned to header extraction circuit (J+3L−3)/L if J mod L=2, J<(N/Q), and data lane J includes a start of a packet. If J mod L=3, and data lane J includes an end of packet, the request is assigned to header extraction circuit (J+L−3)/L.

Figure 5:
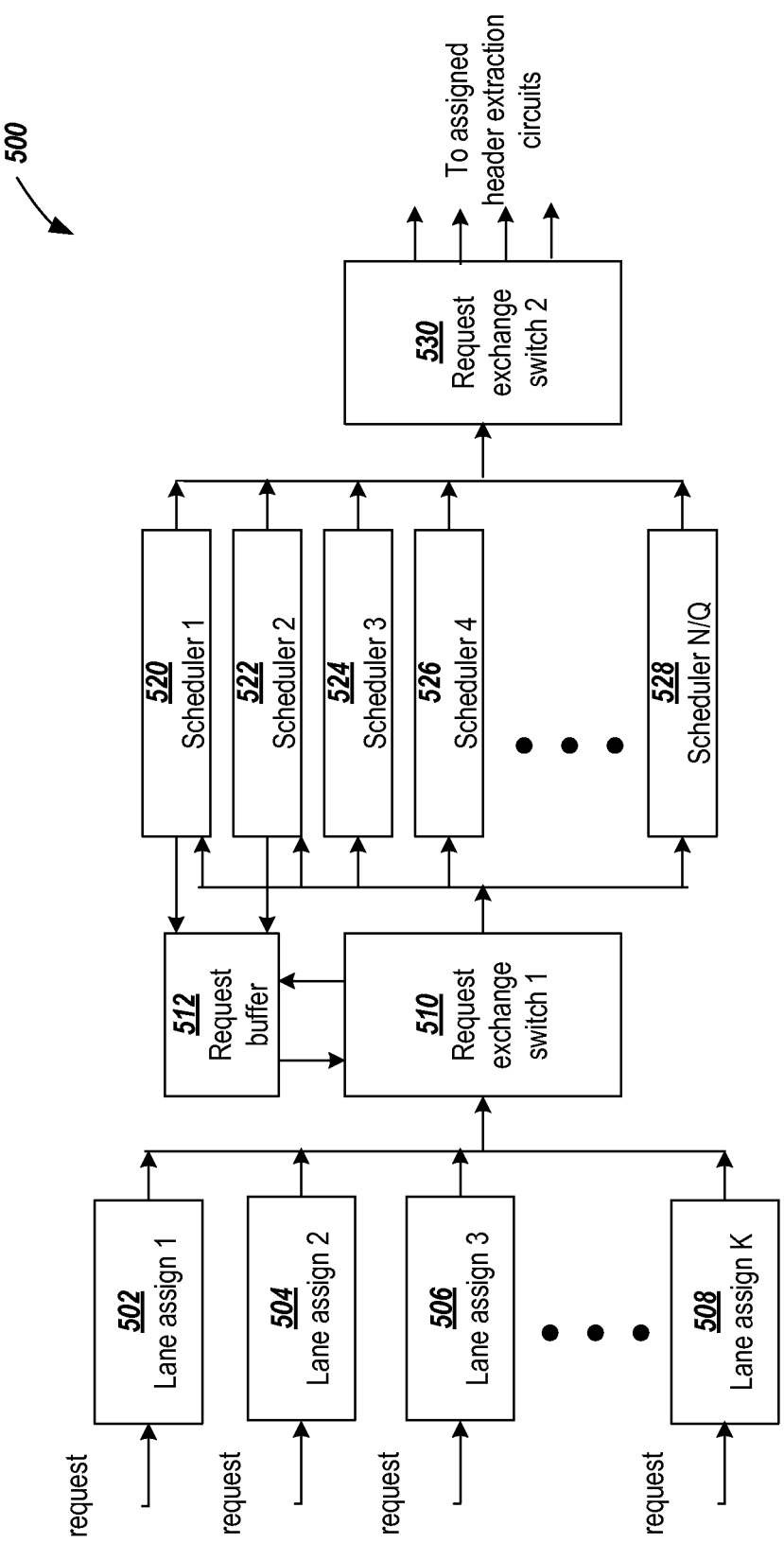
FIG. 5 shows an example request scheduling circuit that may be used to implement scheduling of header extraction requests in accordance with one or more embodiments.

FIG. 5 shows an example request scheduling circuit that may be used to implement scheduling of header extraction requests in accordance with one or more embodiments. As described with reference to FIG. 2, the request scheduling circuit receives a set of extraction requests for each word received on a data bus. The request scheduling circuit 500 includes a plurality of lane assignment circuits 502, 504, 506, and 508. Each of the lane assignment circuits is configured to receive a request to extract a header and determine which data lane(s) of the data bus contain the header indicated by the request.

The request scheduling circuit 500 includes a plurality of scheduler circuits 520-528, including one scheduler circuit corresponding to each data lane of the data bus. Each extraction request is routed, via request exchange switch 510, from one of the lane assignment circuits 502-508 to the scheduler circuit corresponding to the data lane at which the header indicated by the request begins.

Scheduler circuits 520-528 assign extraction requests to header extraction circuits as described with reference to FIG. 4 above. Extraction requests are scheduled by the scheduler circuits 520-528 for every word received on the data bus. However, as described with reference to FIG. 4, all necessary header information may not be available in one word. For example, a packet header may begin in the current word but continue into a subsequent word. In such situations, the scheduling circuit is configured to buffer the corresponding header extraction requests in request buffer 512 until the subsequent word is received. After scheduling is completed, extraction requests are routed from the scheduler circuits to the assigned header extraction circuits via request exchange switch 530.

Figure 6:
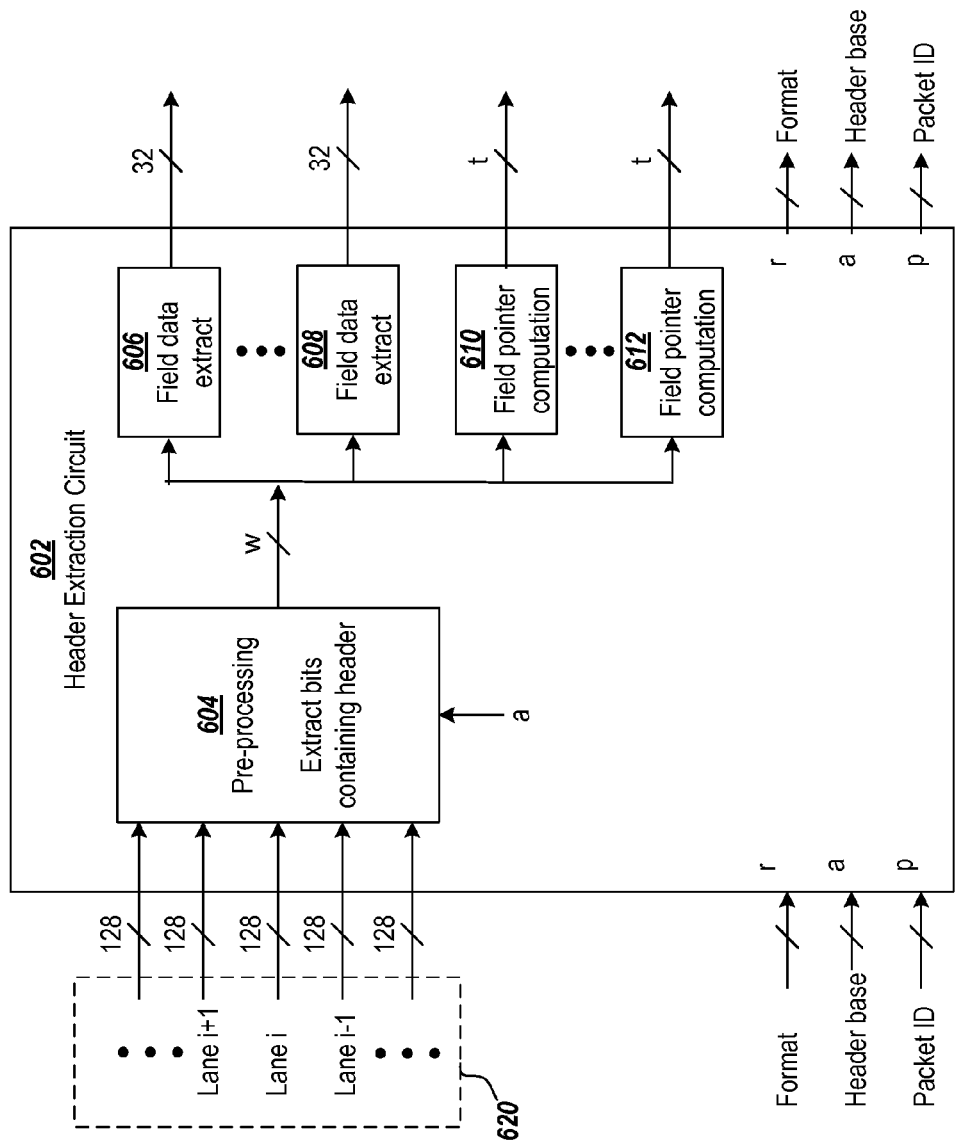
FIG. 6 shows an example implementation of a header extraction circuit in accordance with one or more embodiments.

FIG. 6 shows an example implementation of an instance of one of the header extraction circuit shown in FIG. 4. The header extraction circuit 602 is configured to receive and extract header information from a subset of data lanes according to a received header extraction request. In this implementation, the request includes a base address (a) indicating where the header begins in the word, a format number (r) indicating the placement and format of fields included in the header, and a packet ID (p) of the corresponding data packet.

The header extraction circuit 602 includes a number of field data extract circuits 606-608 and a number of field pointer compute circuits 610-612. The field data extract circuits are configured to extract data of respective header fields, and the field pointer compute circuits are configured to determine pointers to respective header fields. Depending on the implementation, the pointers to respective header fields may be determined relative to an offset in the header or relative to an offset in the word.

Each of the field data extract circuits and field pointer compute circuits operates on a different field that is determined by the format number r indicated in the header extraction request.

In this example, the data extract circuits 606-608 are depicted as outputting 32-bit field data, and pointer compute circuits 610-612 are depicted as outputting t-bit pointers. These data values are provided for illustration purposes only. The numbers of data extract circuits 606-608 and pointer compute circuits 610-612 and the lengths of the output header fields and pointers are architectural parameters that may be adjusted according to the header formats that the header extraction circuit is configured to process.

In one embodiment, the header extraction circuit 602 includes a pre-processing circuit 604 that selects a portion (w bits) of the received data lanes with the requested header information from the input subset of data lanes according to the header base address a indicated by the extraction request. In some other embodiments, the pre-processing circuit is not implemented and routing circuitry (not shown) external to header extraction circuit 602 may be configured to dynamically route only the data lanes having the requested header information to the header extraction circuit 602. In yet another embodiment, the data extract circuits 606-608 and field pointer computation circuits 610-612 may be configured to extract a respective header field from a received subset of data lanes 620. The data lanes included in the subset 620 depends on the architectural parameters L and S and the position of the extraction circuit in the packet processing circuit as discussed with respect to FIG. 4 above.

Figure 7:
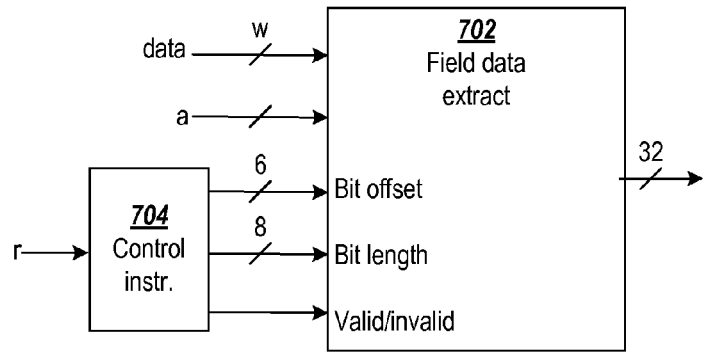
FIG. 7 shows an example circuit that may be used to implement the data extraction circuits shown in FIG. 6.

FIG. 7 shows an example circuit that may be used to implement the data extraction circuits shown in FIG. 6. As described above, packet headers may include a different number of fields at different offsets depending on the format of the packet header. The format number r is input to the data extract circuit and field pointer computation circuit. The data extract circuit receives a format number r that indicates the protocol and the header field that is to be extracted. A control instruction circuit includes a memory that is configured with microcode that directs the circuit 702 how to extract field data for each header format r that may be processed by the packet processing circuit. In response to the input format number r, the control instruction circuit 704 determines a bit offset of the requested field from the start of the header, and the bit length of the requested field. The bit offset and bit length are depicted as 6 and 8 bits, respectively, for purposes of illustration. It will be further recognized that the bit offsets and bit lengths output by the control instruction circuit 704 depend on the possible header formats that the circuit 702 is configured to process. This information is combined with the header base offset, a, to extract the requested field information from the received data. Pointer compute circuits 610-612 shown in FIG. 6 may be implemented with a similar arrangement to determine a bit offset of the desired field and calculate a pointer to the field from the header offset and field offset.

Referring to FIG. 2, it is recognized that header extraction circuits may be implemented using the same microcode in field data extract circuits 702, so that all packets receive the same treatment. Alternatively, the header extraction circuits may be configured with different sets of microcode. For example, a network application may be configured to transmit ATM data packets having a fixed packet size that is equal to the word size and TCP/IP packets that are variable size. If the network is configured to always transmit the ATM packets in the one word, the header will always be processed by the first header extraction circuit. Accordingly, only the first header extraction circuit needs to be configured with microcode to process ATM packers. Likewise, when a plurality of extraction stages are implemented as shown in FIG. 1, different sets of microcode may be used in different extraction stages to process the different header levels. The microcode may be stored in a writeable control store, which allows run-time updating of the header extraction circuits. This allows the addition, modification, and removal of rules for particular header formats.

Figure 8:
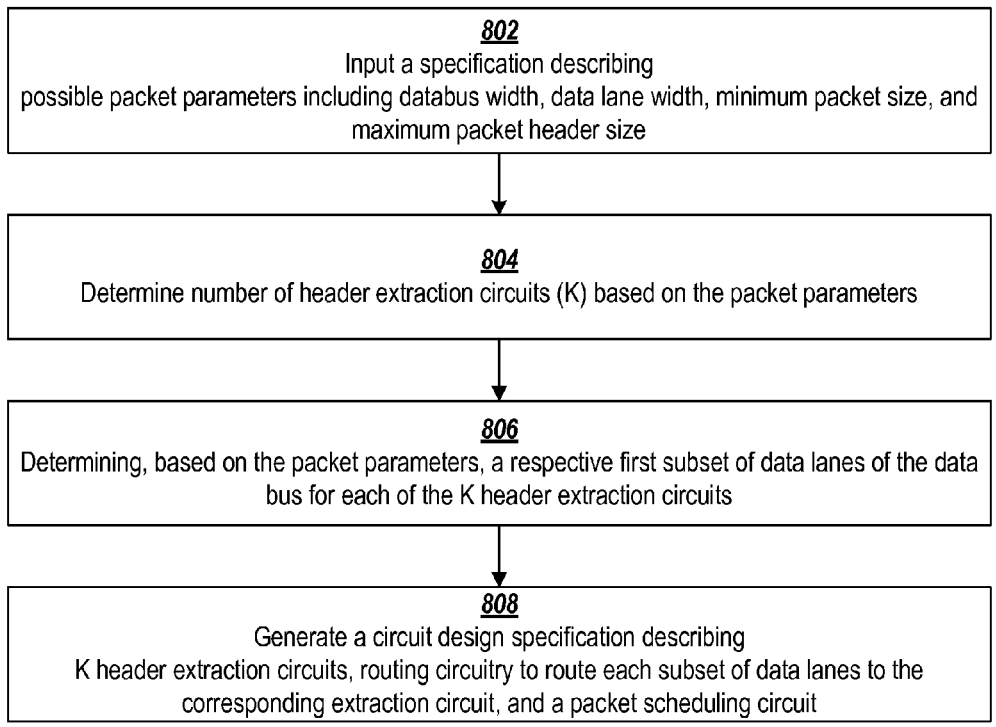
FIG. 8 shows a flowchart of a process for generating a data packet processing circuit configured in accordance with one or more embodiments.

In one or more embodiments, a software design tool may be configured to generate and configure a network data packet processing circuit as described above. FIG. 8 shows a flowchart of a process for generating a network data packet processing circuit design. A specification describing possible packet parameters is input at block 802. In this example implementation, the packet parameters include the width, N, of the data bus, a data lane width, Q, a minimum packet size, M, and a maximum packet header size, H. A number of header extraction circuits K needed to extract header information for a maximum number data packets that may be received in parallel on the data bus is determined at block 804 based on the packet parameters. A respective subset of data lanes of the data bus is selected for each of the K header extraction circuits at block 806 based on the packet parameters as described with reference to FIG. 4.

A hardware descriptive language (HDL) circuit design specification, such as Verilog or VHDL, is generated at block 808. The circuit design specification describes a packet processor having K header extraction circuits, routing circuitry to route each selected subset of data lanes to the corresponding header extraction circuit and a packet scheduling circuit. As described above, the scheduling circuit determines a second subset of data lanes that contains the respective header specified by a request, and assigns a respective one of the plurality of header extraction circuits to extract respective header data from the second subset of the plurality of data lanes. The header extraction circuits are assigned such that the second subset is included in the first subset corresponding to the assigned header extraction circuit and such that each header extraction circuit is assigned at most one extraction request per word received on the data bus. The header extraction circuits and/or scheduling circuit may be described by or constructed from predefined circuit design specifications. For example, each header extraction circuit may be generated by instantiating a number of predefined modules, such as field data extract circuits 702, according to the packet parameters and a set of possible header formats.

Figure 9:
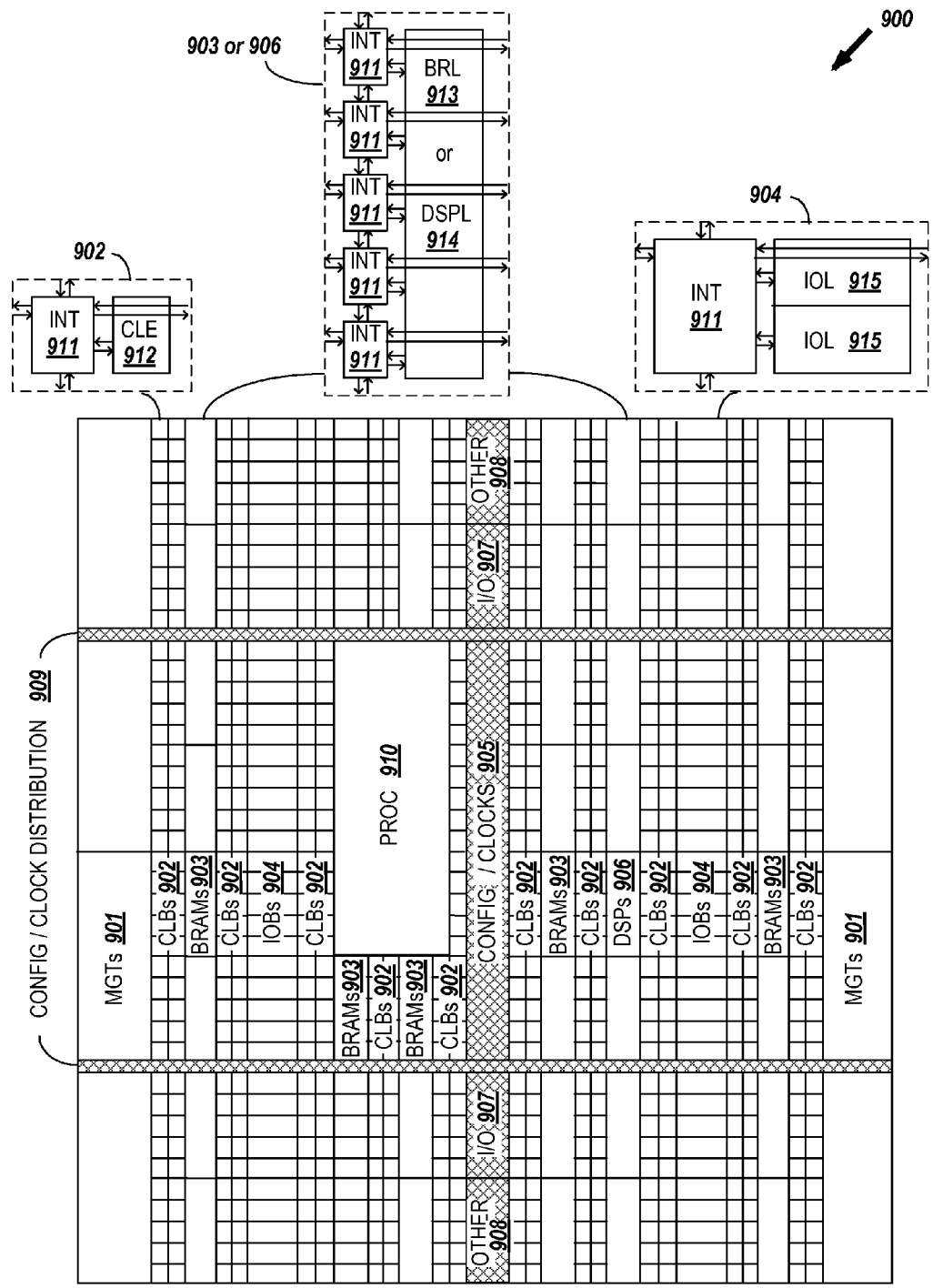
FIG. 9 shows a programmable integrated circuit that may be configured to implement a data packet processing circuit in accordance with one or more embodiments.

FIG. 9 is a block diagram of an example programmable integrated circuit that may be configured to implement a packet processor in accordance with various embodiments. The programmable integrated circuit shown in FIG. 9 is known as a field programmable gate array (FPGA). A packet processing circuit, as previously described, may be implemented on the programmable logic and interconnect resources of the FPGA.

FPGAs can include several different types of programmable logic blocks in the array. For example, FIG. 9 illustrates an FPGA architecture (900) that includes a large number of different programmable tiles including multi-gigabit transceivers (MGTs 901), configurable logic blocks (CLBs 902), random access memory blocks (BRAMs 903), input/output blocks (IOBs 904), configuration and clocking logic (CONFIG/CLOCKS 905), digital signal processing blocks (DSPs 906), specialized input/output blocks (I/O 907), for example, e.g., clock ports, and other programmable logic 908 such as digital clock managers, analog-to-digital converters, system monitoring logic, and so forth. Some FPGAs also include dedicated processor blocks (PROC 910) and internal and external reconfiguration ports (not shown).

In some FPGAs, each programmable tile includes a programmable interconnect element (INT 911) having standardized connections to and from a corresponding interconnect element in each adjacent tile. Therefore, the programmable interconnect elements taken together implement the programmable interconnect structure for the illustrated FPGA. The programmable interconnect element INT 911 also includes the connections to and from the programmable logic element within the same tile, as shown by the examples included at the top of FIG. 9.

For example, a CLB 902 can include a configurable logic element CLE 912 that can be programmed to implement user logic plus a single programmable interconnect element INT 911. A BRAM 903 can include a BRAM logic element (BRL 913) in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 906 can include a DSP logic element (DSPL 914) in addition to an appropriate number of programmable interconnect elements. An IOB 904 can include, for example, two instances of an input/output logic element (IOL 915) in addition to one instance of the programmable interconnect element INT 911. As will be clear to those of skill in the art, the actual I/O pads connected, for example, to the I/O logic element 915 are manufactured using metal layered above the various illustrated logic blocks, and typically are not confined to the area of the input/output logic element 915.

In the pictured embodiment, a columnar area near the center of the die (shown shaded in FIG. 9) is used for configuration, clock, and other control logic. Horizontal areas 909 extending from this column are used to distribute the clocks and configuration signals across the breadth of the FPGA.

Some FPGAs utilizing the architecture illustrated in FIG. 9 include additional logic blocks that disrupt the regular columnar structure making up a large part of the FPGA. The additional logic blocks can be programmable blocks and/or dedicated logic. For example, the processor block PROC 910 shown in FIG. 9 spans several columns of CLBs and BRAMs.

Note that FIG. 9 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 9 are purely exemplary. For example, in an actual FPGA more than one adjacent column of CLBs is typically included wherever the CLBs appear in order to facilitate the efficient implementation of user logic.

Figure 10:
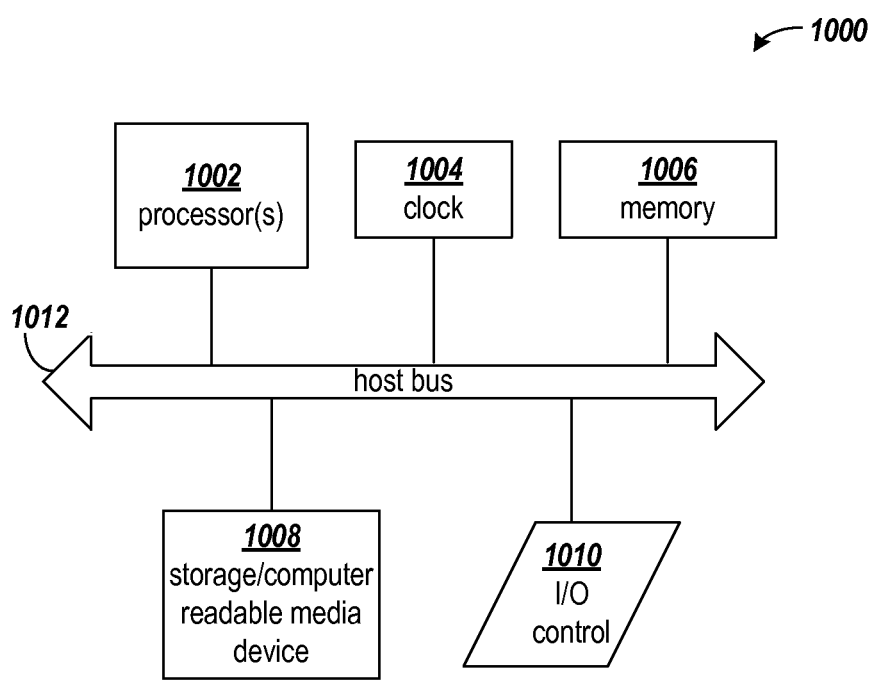
FIG. 10 shows a computer architecture that may be configured to implement the processes and functions described herein.

FIG. 10 shows a block diagram of an example computing arrangement that may be configured to implement the processes and functions described herein. It will be appreciated that various alternative computing arrangements, including one or more processors and a memory arrangement configured with program code, would be suitable for hosting the processes and data structures and implementing the algorithms of the different embodiments. The computer code, comprising the processes of one or more embodiments encoded in a processor executable format, may be stored and provided via a variety of computer-readable storage media or delivery channels such as magnetic or optical disks or tapes, electronic storage devices, or as application services over a network.

Processor computing arrangement 1000 includes one or more processors 1002, a clock signal generator 1004, a memory unit 1006, a storage unit 1008, and an input/output control unit 1010 coupled to a host bus 1012. The arrangement 1000 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 1002 may be one or more general purpose processors, or a combination of one or more general purpose processors and suitable co-processors, or one or more specialized processors (e.g., RISC, CISC, pipelined, etc.).

The memory arrangement 1006 typically includes multiple levels of cache memory, and a main memory. The storage arrangement 1008 may include local and/or remote persistent storage such as provided by magnetic disks (not shown), flash, EPROM, or other non-volatile data storage. The storage unit may be read or read/write capable. Further, the memory 1006 and storage 1008 may be combined in a single arrangement.

The processor arrangement 1002 executes the software in storage 1008 and/or memory 1006 arrangements, reads data from and stores data to the storage 1008 and/or memory 1006 arrangements, and communicates with external devices through the input/output control arrangement 1010. These functions are synchronized by the clock signal generator 1004. The resource of the computing arrangement may be managed by either an operating system (not shown), or a hardware control unit (not shown).

The embodiments of the present invention are thought to be applicable to a variety of packet processors. Other aspects and embodiments will be apparent to those skilled in the art from consideration of the specification and practice of the invention disclosed herein. The embodiments may be implemented as one or more processors configured to execute software, as an application specific integrated circuit (ASIC), or as a logic on a programmable logic device. It is intended that the specification and illustrated embodiments be considered as examples only, with a true scope of the embodiments being indicated by the following claims.

What is claimed is:

1. A packet processing circuit, comprising:
   a plurality of header extraction circuits, wherein each header extraction circuit is coupled to receive a respective subset of a plurality of data lanes of a data bus, and the respective subsets of data lanes overlap; and
   a scheduling circuit coupled to the plurality of header extraction circuits, the scheduling circuit configured and arranged to:
      receive a plurality of requests to extract header data of a respective packet from the plurality of data lanes; and
      in response to each request of the plurality of requests:
         determine a first subset of the plurality of data lanes that contains the respective header specified by the request; and
         assign a respective one of the plurality of header extraction circuits to extract respective header data from the first subset of the plurality of data lanes;
   wherein the header extraction circuits are further configured to extract the respective header data in parallel.

2. The packet processing circuit of claim 1, wherein:
   the data bus is an N-bit data bus; and
   the plurality of header extraction circuits includes a number of header extraction circuits, K, that is greater than or equal to a maximum number of packets that can be received in parallel on the data bus.

3. The packet processing circuit of claim 2, wherein:
   each data lane is Q bits;
   a maximum header size of a header of a data packet received in the N-bit data occupies S data lanes; and
   the first subset of data lanes includes a number of data lanes, L, L*Q being equal to a minimum size data packet that may be received on the data bus.

4. The packet processing circuit of claim 3, wherein L=2 and for header extraction circuits i, $1<=i<=K$:
   for i=1, header extraction circuit i is configured to receive data exclusively from data lanes 1 through 2+(S−1), and data from previous words received on S data lanes;
   for $1<i<K$, header extraction circuit i is configured to receive data exclusively from data lanes, 2*i−2 through 2*i+(S−1); and
   for i=K, header extraction circuit i is configured to receive data exclusively from data lanes 2*K, 2*K−1, and 2*K−2.

5. The packet processing circuit of claim 4, wherein the scheduling circuit is configured to, in response to receiving a request received on data lane J (J<K):
   for J an even number data lane that does not include an end of packet, assign the request to header extraction circuit J/2+1; and
   otherwise, assign the request to header extraction circuit (J−1)/2.

6. The packet processing circuit of claim 5, wherein the scheduling circuit is further configured to, in response to receiving a request in which all required header data is not present in the current data word, buffer the request for processing in a subsequent data word.

7. The packet processing circuit of claim 3, wherein L>2 and for header extraction circuit i ($1<=i<=K$):
   for i=1, header extraction circuit i is configured to receive data exclusively from data lanes 1 through 3+S, and data from a previous word received on S data lanes;
   for $1<i<K$, header extraction circuit i is configured to only receive data from data lanes L*(i−2)+2 through L*(i−1)+(S+3); and
   for i=K, header extraction circuit i is configured to only receive data from data lanes L*(K−2)+2 through N/Q.

8. The packet processing circuit of claim 6, wherein the scheduling circuit, in response to receiving a request received on data lane J is further configured to:
   for J mod L=2 and J<(N/Q) and data lane J including a start of packet, assign the request to header extraction circuit (J+3L−3)/L; and
   for J mod L=3 and data lane J including an end of packet, assign the request to header extraction circuit (J+L−3)/L.

9. The packet processing circuit of claim 1, further comprising a routing circuit configured to, in response to the scheduling circuit assigning one of the plurality of header extraction circuits to extract the header data from the first subset of the plurality of data lanes, route data from the first subset of lanes of the data bus to the assigned one of the plurality of header extraction circuits.

10. The packet processing circuit of claim 1, wherein each of the requests specifies a packet header type, a packet identifier, and a header address.

11. The packet processing circuit of claim 10, wherein each of the packet header extraction circuits is configured to, in response to being assigned to extract header data from the first subset of data lanes, determine an offset of the header data within the first subset of data lanes and a length of the header data from the packet header type indicated by the request.

12. The packet processing circuit of claim 1, wherein the header data includes data of one or more header fields.

13. The packet processing circuit of claim 1, wherein the header data includes one or more pointers to respective header fields.

14. The packet processing circuit of claim 1, wherein the scheduling circuit is configured and arranged to receive a set of the one or more requests to extract header data of respective packets from the data bus for each word received on the data bus.

15. A pipelined packet processing circuit, comprising:
a plurality of memory buffers configured and arranged in a pipeline to buffer words received from a data bus, each memory buffer configured to output a buffered word in a plurality of data lanes; and
a plurality of extraction stages arranged in a pipeline and respectively coupled to the plurality of memory buffers, each extraction stage configured and arranged to extract headers of a different level of a data packet in a word buffered on the pipeline of memory buffers, each extraction stage comprising:
a plurality of packet header extraction circuits; and
a scheduling circuit coupled to the plurality of packet header extraction circuits, the scheduling circuit configured and arranged to:
receive one or more requests to extract respective packet headers from a word stored in the respectively coupled memory buffer; and
for each request:
determine a first subset of the data lanes of the word output by the respective memory buffer that contains the respective header specified by the request; and
assign a respective one of the header extraction circuits to extract the header from the first subset of lanes.

16. The pipelined packet processor of claim 15, further comprising a packet detection circuit coupled to one of the memory buffers, the packet detection circuit configured and arranged to:
detect a start of each data packet; and
in response to detecting the start of a packet:
generate a request to extract a corresponding packet header from the word stored in a first one of the plurality of memory buffers; and
transmit the generated request to a first one of the plurality of extraction stages.

17. The pipelined packet processor of claim 15, further comprising at least one request construction circuit coupled to a respective one of the extraction stages, each request construction circuit configured and arranged to:
generate a request to extract a second level header of a packet in response to information extracted by the respective extraction stage indicating a packet includes the second level header; and
transmit the generated request to another one of the plurality of extraction stages.

18. A method of generating a network packet processing circuit, comprising:
inputting a specification describing packet parameters including a data bus width (N), a lane width (Q) of each of a plurality of data lanes of the data bus, a minimum packet size of packets to be received via the data bus, and a maximum header size of the packets to be received via the data bus;
determining a number of header extraction circuits (K) based on the packet parameters;
determining a respective first subset of the data lanes for each of the K header extraction circuits based on the packet parameters; and
generating a circuit specification describing a packet processor including:
K header extraction circuits;
routing circuitry configured and arranged to route data from each respective first subset of the data lanes to the one of the K header extraction circuits; and
a scheduling circuit coupled to the K header extraction circuits, the scheduling circuit configured and arranged to:
receive one or more requests to extract header data of a respective packet from a word received on the data bus; and
in response to each request:
determine a second subset of the plurality of data lanes that contains the respective header specified by the request; and
assign a respective one of the plurality of header extraction circuits to extract respective header data from the second subset of the plurality of data lanes, the second subset of the plurality of data lanes being included in the respective first subset of the plurality of data lanes.

19. The method of claim 18, wherein:
the packet parameters include a maximum header depth (M); and
the circuit specification describes a packet processing pipeline including:
M buffers arranged in a pipeline and configured to buffer the plurality of data lanes of the data bus for M words received on the data bus;
M of the packet processors, each of the packet processors configured to extract the respective header data from a respective one of the M buffers; and
M request generation circuits coupled to a respective one of the M packet processors, each request generation circuit configured to generate the one or more requests for the corresponding one of the M packet processor circuits.

* * * * *